United States Patent [19]

Patel

[11] 3,745,482
[45] July 10, 1973

[54] CARBON DIOXIDE LASER EMPLOYING MULTIPLE GASES INCLUDING HELIUM

[75] Inventor: Chandra K. N. Patel, Chatham, N.J.
[73] Assignee: Bell Telephone Laboratories, Incorporated, Murray Hill, N.J.
[22] Filed: Nov. 30, 1970
[21] Appl. No.: 93,564

Related U.S. Application Data

[60] Division of Ser. No. 814,510, March 28, 1969, Pat. No. 3,596,202, which is a continuation-in-part of Ser. No. 409,682, Nov. 9, 1964, abandoned, and a continuation-in-part of Ser. No. 474,546, July 26, 1965, abandoned, and a continuation-in-part of Ser. No. 495,844, Oct. 14, 1965, abandoned.

[52] U.S. Cl............................ 331/94.5 G, 252/372
[51] Int. Cl............................................. H01s 3/00
[58] Field of Search................... 331/94.5; 252/372

[56] References Cited
UNITED STATES PATENTS 3,393,372  7/1968  Vickery et al. .................... 331/94.5
3,464,028  8/1969  Moeller............................. 331/94.5

OTHER PUBLICATIONS

Legay et al.: "Sur les possibilités de réalisation d'un maser oplapou utilisant l'energie de vibration des gaz excités par l'azoteactive" Comp. Rend. t. 259, pp. 99–102, July 6, 1964

Basov et al. "Investigation of the Output Power of a Helium–Neon Laser as a Function of Various Parameters," Optics Spectroscopy, vol. 15, pp. 235–6, Sept., 1963.

Primary Examiner—Edward S. Bauer
Attorney—W. L. Keefauver

[57] ABSTRACT

There is disclosed a laser providing emission of coherent radiation near 10 microns in the far infrared and utilizing transitions between vibrational-rotational levels in carbon dioxide. Also disclosed are beneficial effects from addition of helium to various forms of such a laser.

7 Claims, 5 Drawing Figures

CARBON DIOXIDE LASER EMPLOYING MULTIPLE GASES INCLUDING HELIUM

RELATED APPLICATIONS

This application is one of two concurrently filed divisions of my application Ser. No. 814,510, filed Mar. 28, 1969, now U.S. Pat. No. 3,596,202 which is a continuation-in-part of applications Ser. No. 409,682, filed Nov. 9, 1964; Ser. No. 474,546, filed July 26, 1965; and Ser. No. 495,844, filed Oct. 14, 1965 the latter three of which applications are now abandoned. The other divisional application is Ser. No. 93,565.

BACKGROUND OF THE INVENTION

This invention relates to gas lasers. A gas laser is a device which includes a gaseous active medium capable of the stimulated emission of coherent radiation and means for pumping the medium to propulate selectively an energy level which is optically connected to a lower energy level, whereby there is established a population inversion with respect to such two levels. In a laser oscillator, the overall gain must exceed the losses, including the fractional power output. To achieve oscillations, it is important to enclose the active medium in an optical resonator, from which a portion of the coherent radiation can be extracted. In a laser amplifier an optical resonator is not necessary; but it is important to make provision for introducing a beam to be amplified and for extracting the amplified beam.

The incorporation of the foregoing components into an optical device was proposed by A. L. Schawlow et al. in their Patent, No. 2,929,922, issued Mar. 22, 1960.

The stimulated radiation has several properties which are usually referred to by calling it coherent radiation. The first is a very narrow frequency spectrum, as well as a desired phase relationship. This aspect of coherency is sometimes termed temporal coherency. The second typical property of the coherent light is its capability for being confined in a narrow beam, which property is sometimes termed spatial coherency. One attractive aspect of gas lasers is the high degree of special and temporal coherency that can be obtained.

An attractive aspect of gas lasers consists of the variety of different processes which may be used in the formation and destruction of excited states, in order to obtain population inversion between a pair of optically connected states. As pointed out in the article by W. R. Bennett, Jr., "Gaseous Optical Masers", *Applied Optics, Supplement on Optical Maser*, Vol. 1, page 24 at 34 (1962), optical maser oscillation has been produced in gas systems where population inversion was accomplished by optical pumping, electron impact, excitation transfer in nonelastic atom-atom collisions, and by molecular dissociation in atom-molecle collisions. In addition, in my prior application filed Mar. 15, 1963, now U.S. Pat. No. 3,411,105, pumping of gaseous atoms by electron impact is disclosed in discharges in which molecules have been dissociated.

An important deficiency of gas lasers hitherto has been their very low efficiency, typically small fractions of one percent (1 percent). One interesting approach to this problem is that suggested by J. C. Polanyi, "Proposal for an Infrared Laser Dependent upon Vibrational Excitation," *Journal of Chemical Physics, Vol. 34*, page 347 (1961). Polanyi points out that the radiative lifetimes for vibrationally excited states are several orders of magnitude greater than for electronic states, thus facilitating attainment of relatively high concentrations of selectively excited vibrational species. In addition, vibrational excitations can typically be very efficiently produced. Nevertheless, the specific gases, sodium iodide and hydrogen chloride, suggested by Polanyi are not suitable choices for providing outputs of coherent radiation.

An object of the present invention is a gas laser of improved efficiency and power output.

SUMMARY OF THE INVENTION

I have discovered that the emission of coherent radiation near 10 microns in the far infrared may be efficiently obtained from transitions between vibrational-rotational levels in carbon dioxide. I have also discovered beneficial effects upon efficiency and power output from addition of helium. The beneficial effects of the addition of oxygen and water vapor are disclosed in my above-cited copending divisional application.

One specifically described species of the invention involves a two-gas system, one of which serves as the exciting gas to help establish a population inversion, and the other as the lasing gas from which the desired radiation is stimulated; and there is avoided undesired excitation of the lasing gas by avoiding any treatment of the lasing gas which gives rise to such undesired excitation. Specifically, the lasing gas is not itself subjected to its discharge, in contradistinction with the usual practice in prior art forms of gas lasers.

Nevertheless, as disclosed in my earlier article "Interpretation of $CO_2$ Optical Maser Experiments," *Physical Review Letters*, Vol. 12, page 588 (May 25, 1964), an earlier embodiment of my invention, for establishing the population inversion, employed the electron impact excitation of carbon dioxide directly. Such embodiments are attractive for many applications because of their simplicity.

Carbon dioxide lasers according to my invention may also be pumped by chemical reactions generating carbon dioxide and vibrationally excited nitrogen.

In this first-mentioned embodiment of the invention in which nitrogen serves as the exciting gas and carbon dioxide as the lasing gas, the nitrogen is excited in a separate chamber and thereafter made to flow therefrom into an interaction chamber for mixing there with the carbon dioxide, which is introduced in an unexcited state A continuous flow of both gases is employed for a continuous operation. The carbon dioxide becomes excited in the interaction chamber by collision with the excited nitrogen in a highly selective fashion. The interaction chamber is positioned within an optical resonator which provides the regeneration, to facilitate achieving stimulated emission from the excited carbon dioxide.

The excited nitrogen, which is the exciting medium, includes an excited level which has a relatively long lifetime, typically longer than 0.1 second, and which is not readily destroyed by wall collisions. In addition, as pointed out in the article by Morgan and Schiff, "The study of Vibrationally Excited $N_2$ with the Aid of an Isothermal Calorimeter", *Canadian Journal of Chemistry*, Vol. 41, page 903 at 909 and 910 (1963), this nitrogen level is closely matched in energy to a carbon dioxide vibrational level, which I had found is the upper laser level of the 10.6 micron transition employed in my laser.

With respect to the beneficial effects of the gases, I have discovered that a substantial increase in power output and efficiency of a molecular nitrogen-carbon dioxide laser operating at a wavelength near 10.6 microns can be obtained by adding helium. Overall efficiencies of about 20 percent and continuous-wave power outputs of about 75 watts per meter, even for relatively long lasers, are achievable in this way. The overall efficiency and overall power outputs obtainable are higher than for any other laser, at present. In specifically described embodiments employing helium, the tube containing the gaseous mixture has a diameter in the lasing region of two inches or more.

BRIEF DESCRIPTION OF THE DRAWING

The invention will be further described in the following more detailed description, taken in conjunction with the accompanying drawings, in which.

DESCRIPTION OF ILLUSTRATIVE EMBODIMENTS

Figure 1:
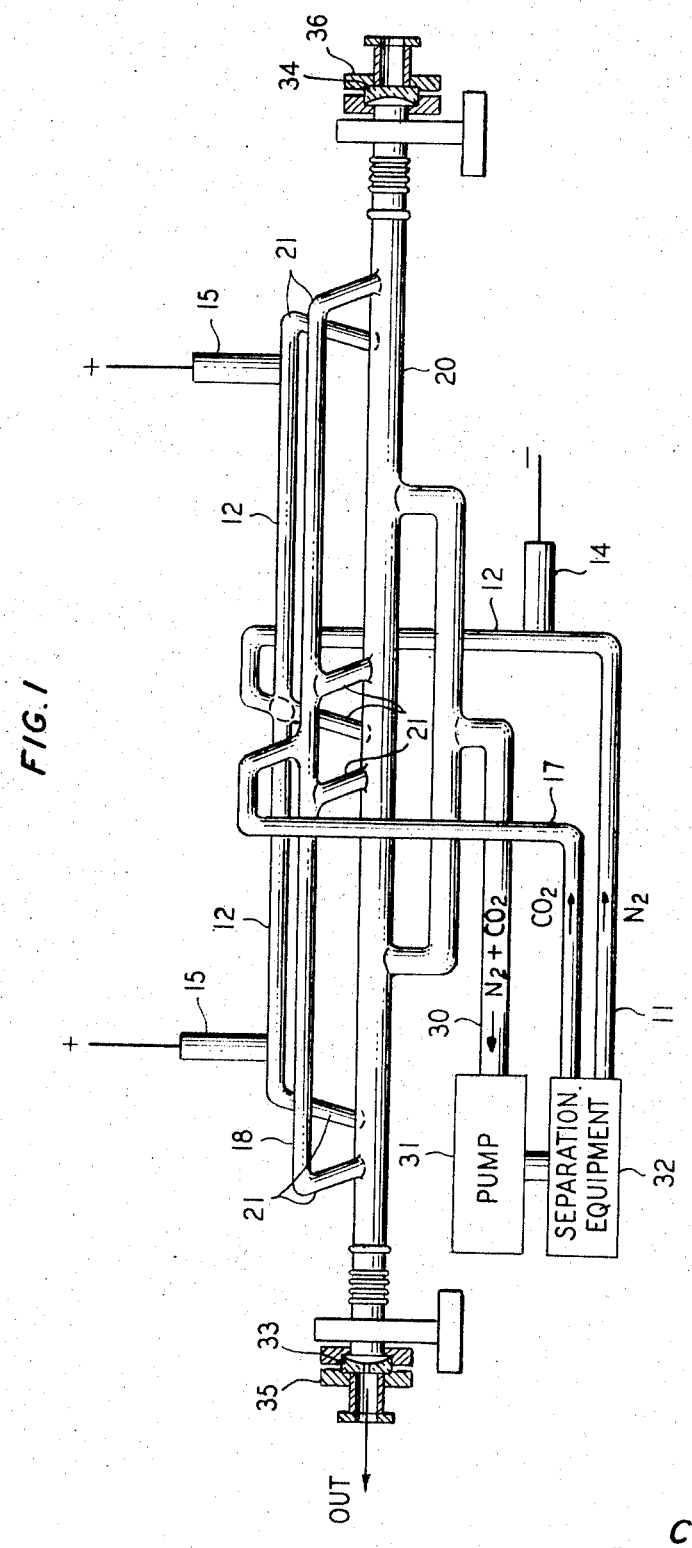
FIG. 1 shows schematically a partially cut-away view of an illustrative embodiment of the invention.

With reference now to the drawing, the laser shown in FIG. 1 includes a first section where the nitrogen which serves as the exciting gas is treated for the production of molecules in the vibrational level of the ground electronic state. In the embodiment depicted, this involves subjection of the nitrogen to a d-c discharge where electron-ion recombinations, atom-atom recombinations and excitation indirectly by electron impact on nitrogen molecules as well as cascades provide the desired excitation of the nitorgen molecules. In particular, nitrogen. advantageously of a purity better than 99.99 percent, is introduced into the discharge region via an inlet port 11 for continuous flow, for example, at a linear flow rate of the order of 500 centimeters per second. The dischage is confined within the multisection glass tube 12. In the design being described specifically, this tube has an inner diameter of about 20 millimeters. The discharge region in this tube is defined by the cathode 14 and the pair of anodes 15. The use of two spaced anodes permits elongation of the discharge path without a corresponding increase in the d-c voltage required. A d-c voltage source (not shown) supplies the power necessary. For the design being described involving a separation of about 60 centimeters between the cathode and each anode, 2,000 volts with a current flow of 9 milliamperes proved satisfactory. Such voltages and currents provide a discharge that is substantially cooler than the discharge employed in my above-cited Patent, No. 3,411,105, and produces much less molecular dissociation in the discharge.

The now excited nitrogen is made to flow out of the discharge region into the interaction region, into which is also introduced unexcited carbon dioxide, also advantageously of high purity, by way of inlet port 17 and distribution tube 18. The interaction region is enclosed within a glass tube 20. In the design being described, this tube has an inner diameter of about 25 millimeters. To improve the mixing of the exciting nitrogen and the lasing carbon dioxide, the nitrogen and carbon dioxide are each introduced into the interaction region at a number of separate inlets 21, spaced apart along the interaction region as shown. To keep small the amount of atomic nitrogen introduced into the interaction region, and thereby to improve the efficiency of the interacting, the distance between the discharge region and the point at which nitrogen enters the interaction region advantageously is made in each instance at least 6 centimeters to provide time for substantial completion of all the atomic and electron-ion recombination in the nitrogen before mixing with the carbon dioxide. In the design discussed, the carbon dioxide and nitrogen flow rates were adjusted to be nearly equal with a total gas pressure of 0.8 Torr in the interaction region.

The spent gases are withdrawn from the interaction region by way of the exhaust port 30 under the action of a pump 31 which controls the flow. Advantageously, as shown, the mixture evacuated is supplied to apparatus shown schematically for separating the two components and after separation returning the separate components to the appropriate inlet ports of the system. The separation apparatus has not been shown in detail as the techniques for such separation are known. Typically, separation would involve passing the mixture through a cold trap for solidification of the carbon dioxide.

To achieve oscillation, it is important to enclose the interaction region in an optical resonator. In the specific design being discussed, the resonator was formed by a pair of near confocal concave mirrors 33, 34 spaced apart about 1.4 meters and supported by suitable mirror mounts 35, 36, respectively. The mirrors are illustratively pressed polyerystalline zinc sulfide coated to be opaque with vacuum-deposited gold, and energy was coupled out from the resonator through a 0.5 millimeter aperture in the center of mirror 33.

If the laser be intended for use as a straight-through amplifier, the resonator becomes unnecessary and the mirrors can be eliminated. In some instances, it may be preferred to locate the mirrors outside the interaction region, in which case Brewster-angle windows of material transmissive at 10.6 microns, for example, pressed polycrystalline zinc sulfide, barium fluoride or potassium chloride, can be used to confine the interaction region.

A discharge in low pressure nitrogen results in very efficient production of nitrogen molecules in the vibrational levels of their ground electronic state. Since nitrogen has a zero permanent dipole moment, such molecules cannot decay to the $v = 0$ vibrational level through electric dipole radiation. Thus, the effective lifetimes of these states are governed primarily by deactivation through collisions with other molecules and walls, and accordingly can be high, for example, several seconds.

Figure 2:
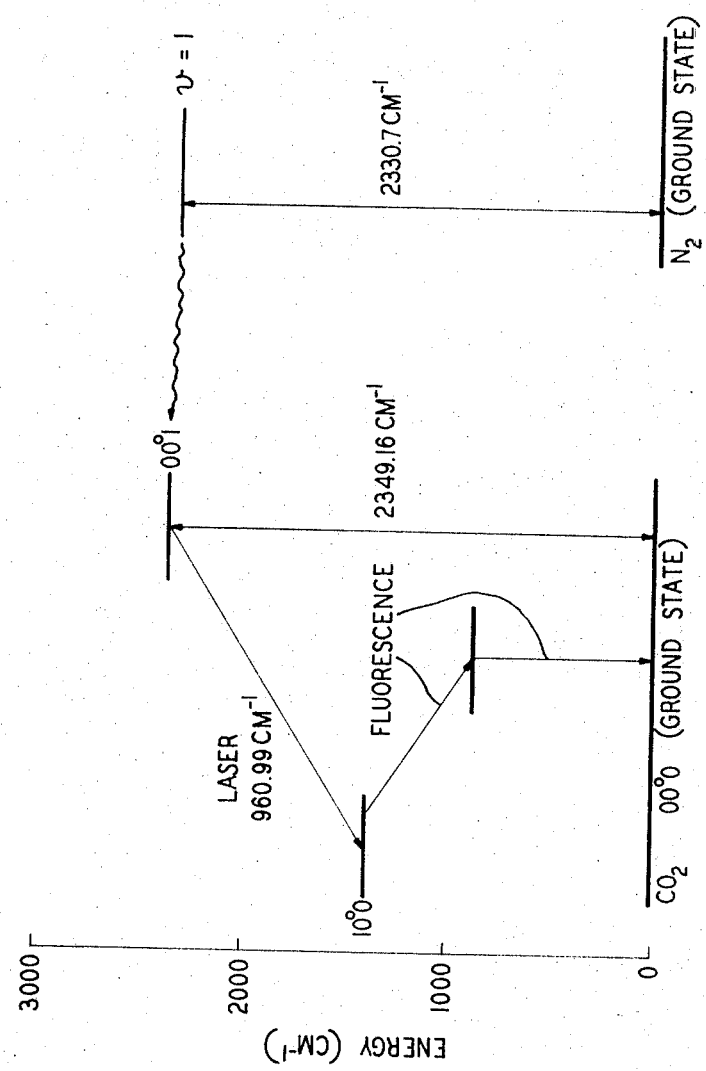
FIG. 2 is a partial energy-level diagram of the $N_2$-$CO_2$ system, which will be useful in describing the invention.

In FIG. 2, there is shown the vibrational level $v = 1$ for nitrogen with respect to the ground state of nitrogen. The other vibrational levels have been omitted for simplicity as unimportant. There have also been shown the vibrational energy levels of carbon dioxide of interest, with respect to its ground state (00°0). It can be seen that $N_2$ ($v = 1$) at 2,330.7 cm$^{-1}$ is in very close coincidence with the (00°1) vibrational level of $CO_2$ at 2,349.16 cm$^{-1}$. Thus, a collision of the second kind can have a large cross section because of the near-perfect coincidence. The lower laser level (10°0) on the other hand is removed from $N_2$ ($v = 1$) by more than 900 cm$^{-1}$ and hence the cross section for exciting the $CO_2$ ground state molecules to the lower laser level will be very much smaller. Moreover, the excitation of $CO_2$ (00°0) molecules to level (10°0) involves a reaction which includes transitions which are optically forbidden. Thus, when the excited nitrogen molecules are allowed to mix with the carbon dioxide molecules, a selective excitation of $CO_2$ ground state molecules to the (00°1) level takes place. Moreover, since the lifetimes of the (00°1) levels are longer than the lifetimes of the (10°0) levels, the required conditions for laser action on the (00°1) − (10°0) transitions are satisfied. The particles thereafter relax from the (10°0) level to the ground state in cascade fashion as depicted schematically. The decay processes which are most important are the ones which involve collisions with other gas particles.

Laser oscillations were obtained at a number of wavelengths involving P-branch rotational transitions from P(14) to P(26). The strongest transition, corresponding to P(20), occurs at 10.5915 microns, and continuous wave power in excess of 1 milliwatt was readily obtained with less than 20 watts input power. As disclosed in my above-cited article of May 25, 1964, laser oscillation was also obtained on vibrational-rotational transitions of the carbon dioxide at 9.6 microns.

There are a large number of reactions through which one can produce various diatomic molecules in vibrationally excited levels and hence the selective excitation through vibrational energy transfer is applicable for obtaining laser action on vibrational-rotational transitions of polyatomic molecules in other mixed systems. Molecules in vibrationally excited levels are of special importance for both the exciting and the lasing gases because of the longer lifetimes available with such molecules. Another requirement on the exciting gas is that its excited molecules not be easily destroyed by wall collisions, making it feasible for transport of these molecules from the discharge region to the interaction region without excessive destruction. In some instances, it may be advantageous to treat the walls to minimize their effect on the lifetimes of incident excited particles. Also, it is advantageous that the molecule exhibit no permanent dipole moment so as to avoid radiative transitions between vibrational levels. This ordinarily means that the molecule of the exciting gas should be composed of like atoms. Additionally, of course, there is required the close coincidence between the vibrational level of the exciting gas and an upper level of the lasing gas, which level is optically connected to a lower level.

The specified conditions are also met, for example, in an $N_2$-$N_2O$ system and an $O_2$-$CS_2$ system (the first gas being the exciting gas and the second the lasing gas). In particular, the apparatus described has been used to generate oscillations in the $N_2$-$N_2O$ system at 10.8422 microns and other wavelengths.

It is a further advantage of lasers of the kind described that due to the absence of any discharge in the interaction region, the usual inverse relation of optical gain with diameter of the interaction region is typically not applicable here. Thus, the diameter of the interaction chamber can be increased with little adverse effect on the optical gain. Rather, because an increase in diameter can be translated into an increase in number of excited molecules, the optical power output can be increased by increasing the diameter of the interaction chamber.

Figure 3:
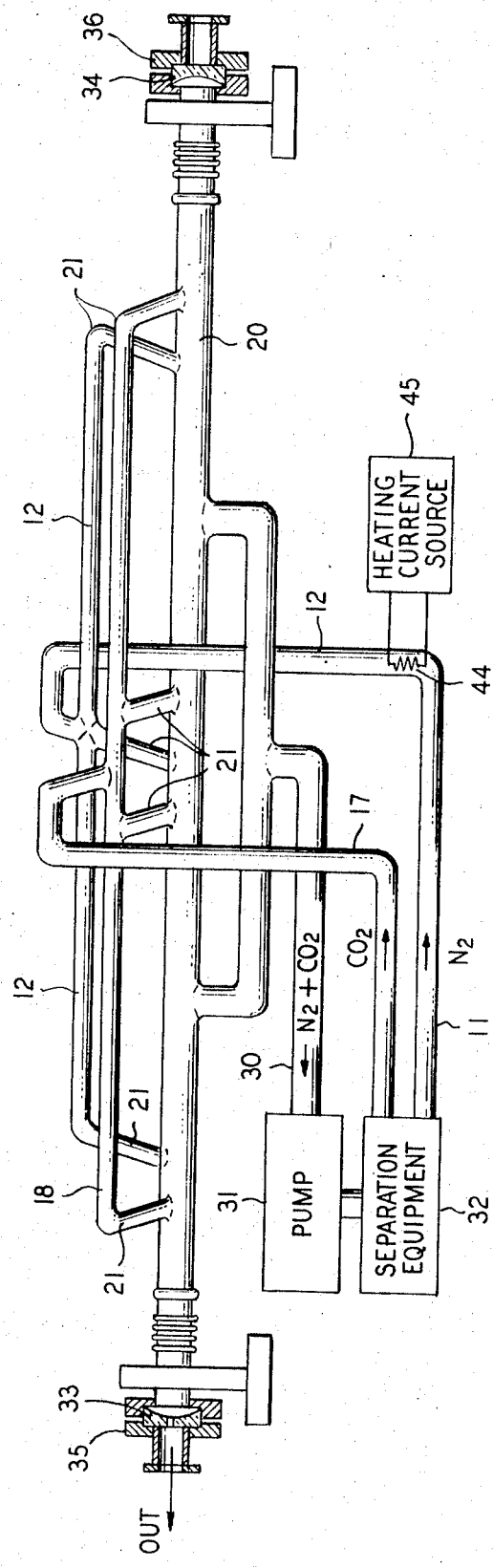
FIG. 3 shows schematically a modification of the embodiment of FIG. 1.

Various other techniques are feasible for the excitation of the exciting molecules. Such modifications include the use of a radio frequency discharge rather than a d-c discharge and, most simply, heating the exciting gas to populate the desired $v = 1$ level. For example, with nitrogen at 1,440° K., the population corresponding to the Boltzmann distribution in the $v = 1$ vibrational level is about ten percent (10 percent) of the total nitrogen population, which is more than adequate for achieving lasing action with carbon dioxide. Such heating can be achieved simply by flowing the nitrogen past a heating element before introduction into the interaction region. In FIG. 3 such heating is illustratively provided by a heating element 44 of known type disposed within the region defined by tube 12. Heating element 44 may, for example, be energized from an electrical current source 45. Additionally, chemical reactions, for example, as described in the paper entitled "Vibrational Disequilibrium in Reactions Between Atoms and Molecules," *Canadian Journal of Chemistry*, Vol. 38, page 1,769 et seq. (1960), can be employed to populate vibrational levels.

Figure 5:
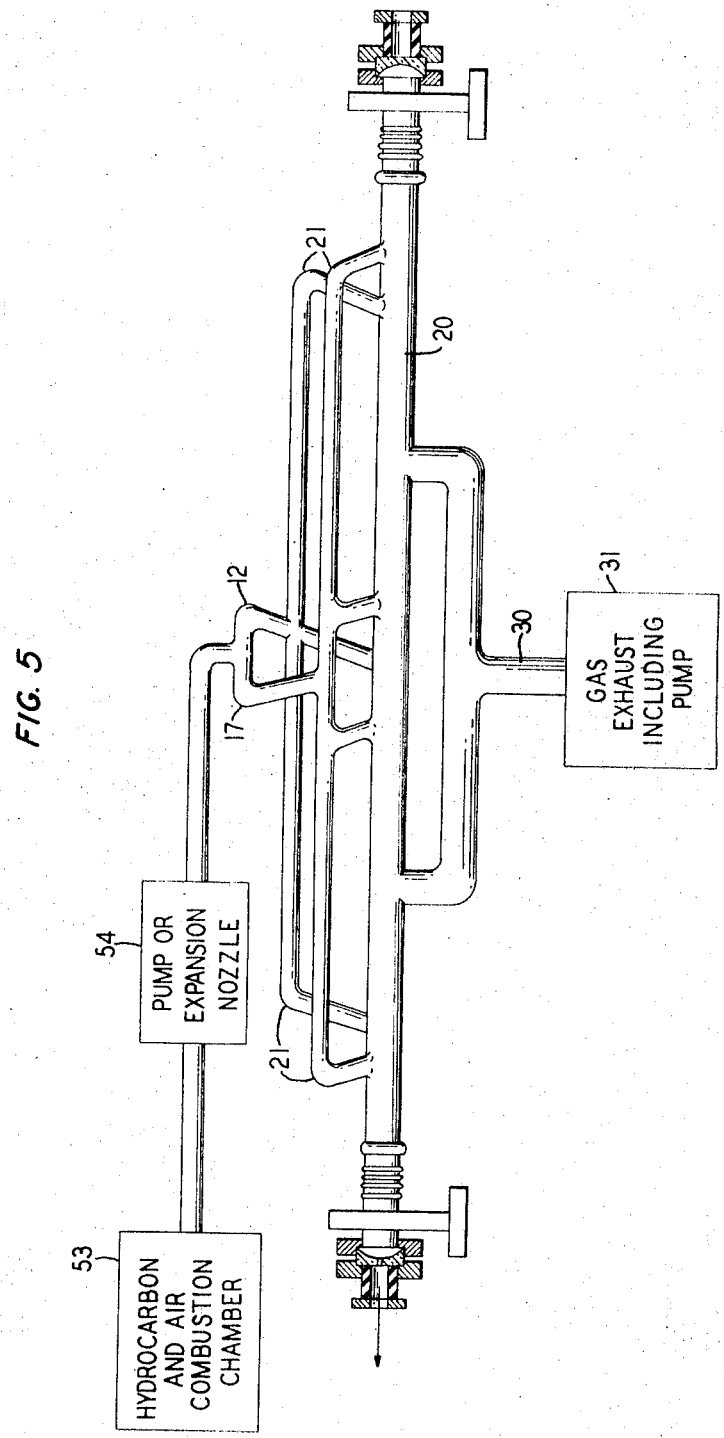
FIG. 5 shows another modification of the embodiment of FIG. 1.

A modification of the embodiment of FIG. 1 excited by a chemical reaction of the type disclosed in the just-cited article is shown in FIG. 5. A hydrocarbon is burned in air in combustion chamber 53, which for example could include a common Bunsen burner, and caused to flow through ducts 12 and 17 by a pump or, advantageously, an expansion nozzle 54. It is known that hydrocarbon-air flames reach a temperature of about 2,500°–3,000° C. The flame products include $CO_2$ and $N_2$ both of which are vibrationally excited because of the high temperature of the flame. Expansion nozzles are well-known means for causing heated gases to flow and reduce the molecular and rotational temperature of molecules at the same time but leave the vibrational temperature unaffected which is a desired condition for laser action on molecular vibrational-rotational transitions. The combustion produces adequate amounts of both carbon dioxide and vibrationally-excited nitrogen. The spent gases are then exhausted to the atmosphere.

In embodiments of my invention employing electron impact excitation of carbon dioxide, the parameters of the discharge in carbon dioxide are similar to those disclosed above for the discharge in nitrogen. That is, the votlages per unit length and the currents are such that the degree of molecular dissociation produced is not great enough to interfere with the generation and coupling out of radiation from the vibrational-rotational transitions near 10 microns. More especially, it is important to maintain a desired concentration of undissociated molecules of carbon dioxide.

In order to improve the power output and efficiency of the $CO_2$ lasers described above, it is important to (a) increase the depopulation rate for the lower laser level (00°1 or 02°0) or (b) increase the rate at which $CO_2$ molecules are excited to the upper laser level (00°1).

I have discovered that helium is an additive which is effective to increase efficiency and power output in a molecular carbon dioxide laser.

Figure 4:
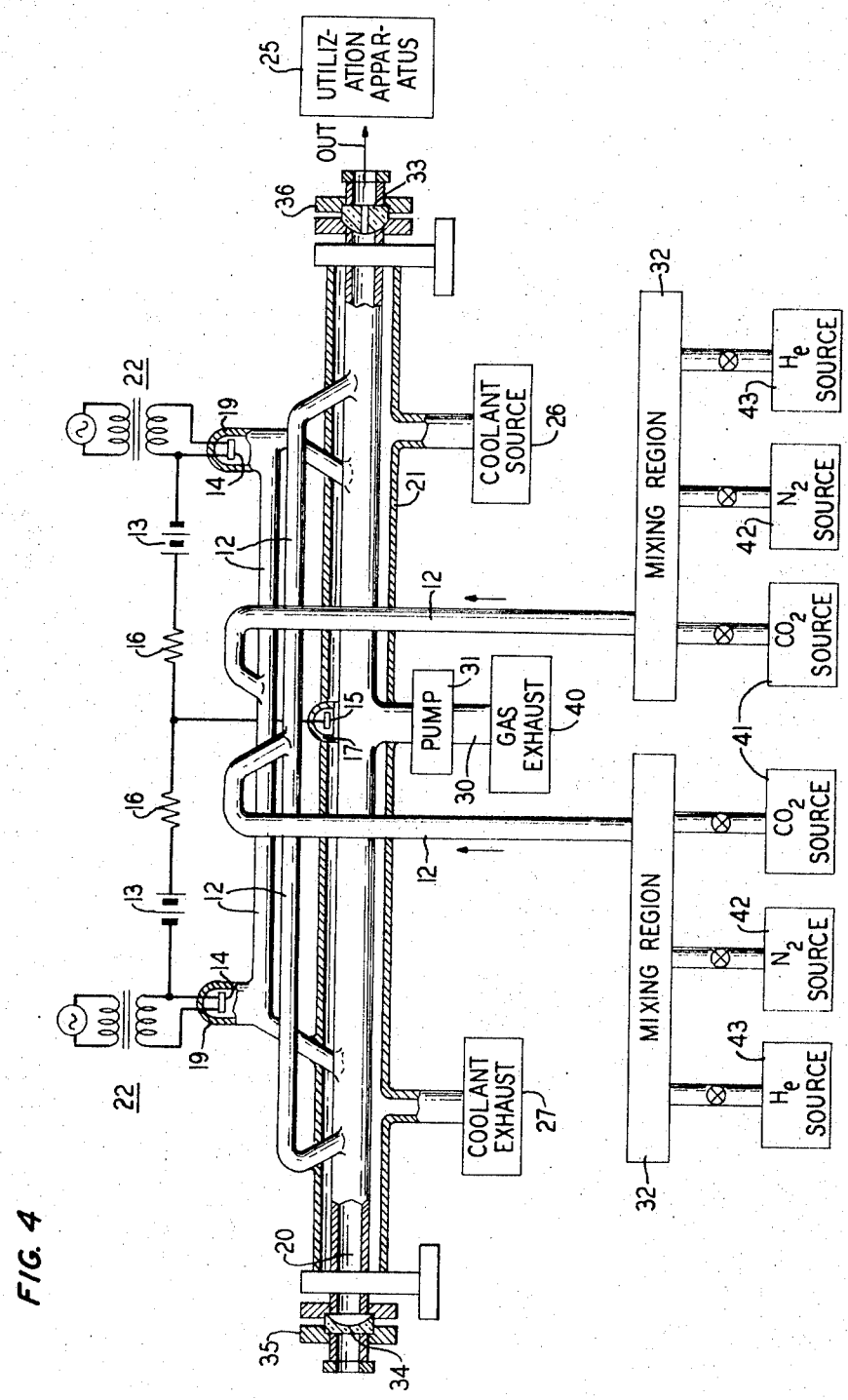
FIG. 4 shows schematically and block diagrammatically a partially cut-away view of another embodiment of the invention employing helium.

As illustrated in FIG. 4, a laser operated with helium added to the gas mixture included the interaction region comprising a tube 20 having an internal diameter of at least 2 inches in the portion in which the lasing action was obtained, apparatus for furnishing therein an appropriate gas mixture and apparatus for exciting the gas mixture with a direct-current discharge with a voltage substantially directly related to the helium partial pressure, as shown in the table of examples below.

Illustratively, the gas mixture was furnished by a continuous flow thereof from suitable sources 41, 42 and 43 of carbon dioxide, nitrogen and helium, respectively. The gases were flowed through mixing regions 32 and inlet apparatus 12 into the interaction region; and the spent gases were removed from the interaction region to the exhaust 40 by a pump 31.

The gas mixture was excited by electrical discharge apparatus disposed, for convenience, in one branch of the inlet apparatus 12. Specifically, the discharge apparatus included the oxide-coated cathodes 14 disposed in bulbous appendages 19 of apparatus 12 near ends of tube 20, the anode 15 disposed in the bulbous appendage 17 of tube 20, the d-c voltage sources 13 with positive terminals connected to anode 15 through current-limiting resistors 16 and negative terminlas connected to cathodes 14, and the heater current sources 22 connected across cathodes 14. Because the anode 15 is disposed in the interaction region of tube 20, the discharge runs directly through the interaction region, in which the lasing action is obtained.

To increase the so-called population inversion between the upper and lower laser levels, i.e., the energy states associated with the stimulated radiation, it is desirable to increase the difference between the so-called rotational temperature and the vibrational temperature of the carbon dioxide. To this end, the tube 20 was surrounded by the jacket 21 through which was flowed a coolant from source 26 to exhaust 27. Water at 15° C. was used in the experiments described in detail herein but any other coolant capable of depressing the rotational temperature of the gas below room temperature could be used, for example, methanol at −78° C., as disclosed in my above-cited copending divisional application. The coolant determined the wall temperature of tube 20 and thus depressed the rotational temperature of the carbon dioxide. It appeared that the vibrational temperature was not substantially affected by the coolant.

To achieve oscillation, it is important to include the interaction region in an optical resonator. In the specific design being discussed, the resonator was formed by a pair of mirrors 33 and 34, the latter concave with 50 meters radius of curvature and the former convex with 48.5 meters radius of curvature in order to enlarge the mode volume to use the entire gas mixture within the interaction region for laser action. For the best results achieved thus far, energy was coupled out from the resonator through a 15 millimeter diameter aperture in the center of convex mirror 33. The mirrors were spaced 300 centimeters apart and were supported by suitable mirror mounts 36 and 35, respectively; and they were coated to be opaque with vaccum-deposited gold. The aperture diameter may vary from any practical lower limit, such as 1.0 millimeter up to 25 millimeters while still obtaining substantially improved results according to the present invention, as compared to previous vibrationally excited gas mixtures. In another embodiment the optical resonator included a pair of concave mirrors having 50.8 centimeters radius of curvature, and the energy was coupled from the optical resonator through a 1.5 centimeter diameter aperture in the center of one of the mirrors. The spacing of the mirrors remains substantially the same. Because of possible lens effect in the following gases because of cooled laser tube walls, apparently it is not possible to calculate the mode volume from the confocal resonator theory.

If the laser be intended for use as a straight-through amplifier, the resonator becomes unnecessary; and the mirrors can be eliminated. In some instances it may be preferred to locate the mirrors outside the interaction region, in which case Brewster-angle windows (for example, of crystalline zinc oxide, barium fluoride or potassium chloride) can be used to confine the interaction region. If the laser be used in the ring laser form, three or more mirrors will be used to form the ring.

Another use for a large diameter laser is as a multipass amplifier. In this case, the mirrors may be disposed to define nonoverlapping paths for the beam in the tube.

The tube 20 in which the multiple gases inter act maybe a glass tube, although it could be some other rigid tubular structure, such as a tube of nonconducting plastic or quartz. The glass tube 20 extended the distance between mirrors 33 and 34 and had an inside diameter of 3 inches. The effective interaction region was observed to extend between the points at which apparatus 12 enters tube 20 and was about 2,5 meters long.

Cathodes 14 were oxide-coated cathodes having platinum bases and containing barium carbonate and strontium carbonate in the respective propertions 55 percent and 45 percent by weight.

Laser oscillation was obtained at a number of wavelengths involving P-branch rotational transitions P(14) to P(26), primarily P(18), P(20), P(22). The strongest transition corresponding to P(20) occurred at 10.5915 microns.

The laser power output was measured by a calibrated thermopile disposed beyond the aperture of convex mirror 33.

It should be understood that the output stimulated radiation has a variety of uses and that the calibrated thermopile could illustratively be replaced by a desired utilization apparatus 23, which could, for example, be an electro-optic modulator responsive to an information signal. The invention is particularly useful for communication, inasmuch as the atmosphere has relatively low attenuation at 10.6 microns. The wavelength range near $10.6\mu$ is commonly called an "atmospheric window".

The best specific example of the operation of my invention obtained in the early experiments involved a mixture in which the carbon dioxide had a pressure of 0.33 Torr, the nitrogen had a pressure of 1.0 Torr and the helium had a pressure of 6.0 Torr. Water was flowed through jacket 21 at 15° C. Each of sources 13 provided 120 milliamperes of current at 4,400 volts, i.e., about 1,058 watts of power; and a continuous-wave power output of 133 watts from the laser was measured by the calibrated thermopile. The ovrall efficiency was 12.5 percent.

Various specific examples of the operation of the invention were as follows, exampe 8 being that just given:

| Example | 1 | 2 | 3 | 4 | 5 | 6 | 7 | 8 |
|---|---|---|---|---|---|---|---|---|
| Pressure: | | | | | | | | |
| $CO_2$, torr | 0.5 | 0.2 | 0.35 | 0.4 | 0.33 | 0.33 | 0.33 | 0.33 |
| $N_2$, torr | 2.5 | 1.0 | 1.0 | 1.0 | 1.00 | 1.0 | 1.0 | 1.0 |
| He, torr | | 4.67 | 5.0 | 3.5 | 4.00 | 5.0 | 5.0 | 6.0 |
| Total mixture flow rate | | | | 3 liters/sec. | | | | |
| Aperture diameter, mms | 10 | 10 | 25 | 10 | 10 | 15 | 15 | 15 |
| Coolant temp., °C | 15 | 15 | 15 | 15 | 15 | 15 | 15 | 15 |
| Coolant flow rate, g.p.m | | | | 10 gallons per minute | | | | |
| Cathode total heater power, watt | | | | 200 watts (100 watts each) | | | | |
| Pumping v.: | | | | | | | | |
| $V_1$ (volts) | 2,700 | 3,800 | 3,800 | 3,800 | 4,000 | 4,800 | 4,700 | 4,400 |
| $V_2$ (volts) | 2,700 | 3,800 | 3,700 | 4,000 | 3,600 | 3,900 | 4,000 | 4,400 |
| Pumping current: | | | | | | | | |
| $I_1$ (MA) | 87 | 160 | 160 | 180 | 150 | 136 | 130 | 120 |
| $I_2$ (MA) | 87 | 140 | 170 | 170 | 185 | 195 | 150 | 120 |
| Pumping power, $W_1$ and $W_2$, watts | 474 | 1,140 | 1,237 | 1,124 | 1,265 | 1,415 | 1,210 | 1,058 |
| Output power, $W_1$ and $W_2$, watts | 15.0 | 55.0 | 53.6 | 82.5 | 103 | 116 | 108 | 133 |
| Efficiency, percent | 3.2 | 4.8 | 4.3 | 7.1 | 8.2 | 8.2 | 9.0 | 12.5 |

Higher gas pressures can be used if the discharge voltage is raised in direct relation to the pressure.

I believe that an important aspect of my present invention resides in my discovery that the tube readily may have an internal diameter greater than about 2 inches and in my discovery that the pressure ratios at a given tube diameter are important for optimum beneficial effect of the helium. The significant factor in the relationship of the tube diameter and gas pressure is preventing deactivation of vibrationally-excited species at the tube wall. Thus, if smaller tube diameters are used, to maintain the efficiency high, there should be increased pressures of the gases, particularly $CO_2$ and helium.

One modification of the present invention involves the use of nitrous oxide as the active gas instead of carbon dioxide. Because of the closeness of certain of its energy levels, useful for laser action, to the corresponding energy levels of carbon dioxide, all of the foregoing considerations stated as applicable to carbon dioxide are also applicable to nitrous oxide. Previous laser experiments with both carbon dioxide and nitrous oxide indicate that these gases are sufficiently similar that the useful ranges of working pressures of nitrous oxide in combination with nitrogen and helium would be approximately the same as the corresponding range of pressures of carbon dioxide. Similarly, the useful ranges of pressure for the helium and the nitrogen should be approximately as described above.

It is now understood that one beneficial role of helium in lasers according to my invention resides in its ability to relax the excitation of molecules having the vibrational energy of the lower laser level. Helium is also important for raising the average electron energy in the discharge, in a manner similar to that shown for oxygen in my above-cited copending divisional application, Ser. No. 93,565.

In all cases, it is understood that the above-described arrangements are illustrative of a small number of the many possible embodiments that can represent applications of the principles of the invention. It can be appreciated that many of the design parameters are interrelated so that in most instances the optimum mixture for a devised tube design is best determined experimentally consistent with the principles outlined. Numerous and other arrangements can readily be devised in accordance with these principles by those skilled in the art without departing from the spirit and scope of the invention. In particular, other arrangements can be used for exciting the gas discharge, such as a radio frequency discharge.

In all of the foregoing embodiments, the gases designated to be present in each of the lasers is present in an amount at least two orders of magnitude greater than trace amounts. In lasers, such as the well-known helium-neon laser, trace amounts are considered to be amounts less than about 10 parts per million by partial pressure.

I claim:
1. An infrared laser comprising:
an active medium including carbon dioxide,
means for selectively populating a first vibrational-rotational level of said carbon dioxide, which vibrational-rotational level is optically connected to a lower vibrational-rotational level via radiation at about 10 microns, to establish a population inversion therebetween, and
means for resonating said radiation to produce coherent radiation at about 10 microns, including means for abstracting a portion of said coherent radiation,
said laser being characterized by a containing means for said active medium, said active medium including nitrogen in a sufficient amount to provide principal means for transferring energy to said carbon dioxide, and by the addition of helium to said active medium in said containing means, the dimensions of said containing means and the amount of said helium together being effective to provide both substantially increased power output and substantially increased efficiency of said laser, the partial pressure of said helium in said containing means being greater than the partial pressure of said carbon dioxide and greater than the partial pressure of said nitrogen.

2. An infrared laser according to claim 1 in which the partial pressure of said carbon dioxide is greater than about 0.2 Torr, the partial pressure of said nitrogen is greater than about 1.0 Torr, and the partial pressure of said helium is greater than about 3.0 Torr.

3. An infrared laser according to claim 2 in which the containing means has lateral walls spaced at least 1 inch from every point of a central axis; said mixture including an active gas consisting essentially of carbon dioxide having a pressure between 0.2 and 0.4 Torr, an auxiliary gas comprising nitrogen having a pressure between 1.0 and 1.5 Torr, and helium having a pressure between approximately 3.0 and 10.0 Torr; and means for supplying a voltage across said mixture, said voltage being directly related to the partial pressure of helium.

4. An infrared laser according to claim 2 in which the containing means comprises a cylindrical tube containing a mixture of gases and permitting the abstraction of radiation at about 10 microns from said gases; said tube having an internal diameter of at least 2 inches; said mixture including carbon dioxide having a pressure between 0.2 and 0.4 Torr, nitrogen having a pressure between 1.0 and 1.5 Torr, and helium having a pressure between 3.0 and 10.0 Torr; and excitation apparatus including an anode, an oxide-coated cathode and a direct-current source connected therebetween to establish a discharge in said mixture, said source having a voltage directly related to the partial pressure of said helium.

5. An infrared laser according to calim 2 in which the containing means comprises a cylindrical tube containing a mixture of gases and having an inlet and outlet for said gases, said tube having an inside diameter of at least 3 inches and having reflective end members, one of said reflective end members being partially transmissive to permit the abstraction of radiation at about 10 microns; means for flowing said mixture continuously through said inlet and outlet; said mixture including carbon dioxide having a pressure between 0.2 and 0.4 Torr, nitrogen having a pressure between 1.0 and 1.5 Torr, and helium having a pressure between 3.0 and 10.0 Torr; a cooling jacket surrounding said tube and apparatus adapted to circulate a coolant through said jacket; and direct-current discharge apparatus comprising an anode disposed with a surface within said tube, an oxide-coated cathode disposed in the flow path of said gas mixture, and a direct-current voltage source connected between said anode and said cathode and having a voltage directly related to the partial pressure of helium in said tube, said apparatus including means for heating said oxide-coated cathode.

6. An infrared laser according to claim 2 in which the carbon dioxide has a partial pressure between about 0.2 and 0.4 Torr, the nitrogen has a partial pressure between about 1.0 and 1.5 Torr, and the helium has a partial pressure between approximately 3.0 and 10.0 Torr.

7. A laser according to claim 6 in which the tube has lateral walls spaced at least 1 inch from every point of a central axis.

* * * * *

Disclaimer 3,745,482.—*Chandra K. N. Patel*, Chatham, N.J. CARBON DIOXIDE LASER EMPOLYING MULTIPLE GASES INCLUDING HELIUM. Patent dated July 10, 1973. Disclaimer filed Sept. 14, 1973, by the assignee, *Bell Telephone Laboratories Incorporated*.

Hereby disclaims the portion of the term of the patent subsequent to July 27, 1988.

[*Official Gazette November 12, 1974.*]